Jan. 14, 1969 I. B. COOPER, JR 3,422,252

CONTROL SYSTEMS

Filed Feb. 12, 1965 Sheet 3 of 3

United States Patent Office 3,422,252

Patented Jan. 14, 1969

3,422,252

CONTROL SYSTEMS

Irving B. Cooper, Jr., Marblehead, Mass., assignor to Industrial Instrumentations, Inc., Marblehead, Mass., a corporation of Massachusetts

Filed Feb. 12, 1965, Ser. No. 432,133

U.S. Cl. 235—61.11 14 Claims

Int. Cl. G06k *7/00;* G11b *5/00*

ABSTRACT OF THE DISCLOSURE

A card reader includes a card sensing area adapted to receive a card. Sensing transformers are disposed in a rectangular matrix along one wall of the sensing area. Each transformer includes two posts connected by a bridge member. A primary winding is disposed on one post and a secondary winding on the other post. A similar reference transformer is mounted outside the sensing area and has its primary winding connected in parallel with the primary windings of the sensing transformers and its secondary winding is connected in series opposition to the secondary windings of the sensing transformers. A 2½ volt 12 k.c.p.s. source energizes all the primary windings.

This invention relates to control systems and more particularly to systems employing a card or article having information encoded thereon and a card reader having a plurality of sensing elements for reading information encoded on such cards or articles.

Vending, accounting and security control systems frequently use cards or other coded devices as a control element. In such systems, a device bearing a particular arrangement of indicia is utilized with a card reader to actuate a controlled apparatus or record the use of an apparatus controlled by the card reader and/or the identity of the user of that apparatus. Such readers should require little or no supervision so that they may be located in unattended facilities. In addition, they should function reliably and require little or no maintenance. Electromagnetic devices have been proposed for use in such systems as they typically do not involve moving parts and require a minimum of maintenance. However, such systems have used specialized components such as "E core transformers" which are expensive and also are difficult to adjust for assured reliable operation.

Accordingly, it is an object of this invention to provide a novel and improved coded article reading system which has no moving parts and requires substantially no maintenance.

Another object of the invention is to provide novel and improved reading apparatus for reading a code on an article passing thereby to activate a controlled circuit in response to the code applied to the article.

Still another object is to provide a novel and improved card reading system that employs only a small number of simple components.

Still another object of the invention is to provide a novel and improved electromagnetic coded card reader which activates a controlled circuit in response to a coded indicia configuration carried by the card.

A further object of the invention is to provide a novel and improved coded article sensing system in which the pattern of indicia sensors may be easily varied.

Still another object of the invention is to provide an improved electromagnetic card reader apparatus saving novel phase and magnitude compensation.

In accordance with the invention there is provided a card reader apparatus that defines a card sensing area. Disposed immediately adjacent the card sensing area are a plurality of sensing transformers each having a U-shaped core structure. Disposed on one leg of the core structure is a primary winding and on the other leg is a secondary winding. The sensing transformers are mounted relative to a card sensing area so that the open ends of the U-shaped magnetic flux path of selected transformers are bridged by flux path modifying material when a card to be sensed is disposed in the card sensing area. There is further provided a reference transformer which produces a compensating output of comparable magnitude to that produced by the sensing transformers. Each secondary winding of a sensing transformer is connected to a unique output line and the secondary winding of the reference transformer is connected in series opposition with the secondary winding of each of the sensing transformers. In the absence of a card in the sensing area, the reference transformer output balances out the output voltage induced in the secondaries of the sensing transformers by their primary windings so that those sensing transformers produce no output signals. When a card is disposed in the sensing area and the flux paths of certain sensing transformers are modified, typically by decreasing the reluctance of the flux paths of those transformers, an increase in output signal from those transformers results, which output signal increase may be sensed, recorded or otherwise utilized to release or operate a controlled apparatus.

In the particular embodiment described hereinafter in detail, the sensing transformers are supported on one wall of the structure that defines the card sensing area. Arranged in this wall is a two-dimensional matrix of apertures, and the leg members of sensing transformer cores are selectively disposed in these apertures with an orientation generally perpendicular to the plane of the card sensing area. These leg members take the form of rods or posts and in each transformer core structure, two adjacent post members are connected by a bridge member of length substantially that of the spacing between apertures. A typical aperture arrangement is a rectangular matrix, but other aperture arrangements, such as a series of concentric circles, may also be used. Through the use of individual bridge and post members, a variety of sensing transformer configurations may be obtained with any two basic core components. A primary winding is disposed on one post and a secondary winding is disposed on an adjacent post, and then the transformer core is completed by the bridge member which may be adhesively secured to the two posts in bridging position to complete the U-shaped electromagnetic flux path of that transformer.

This arrangement provides a simple, economical, versatile and rugged electromagnetic sensing arrangement which involves no moving parts to operate and hence requires minimal maintenance. The matrix construction enables a variety of configurations of the sensing transformers to be provided in a simple structure. Phase and amplitude compensation, if necessary, may be provided by simply connecting resistances or capacitances or combinations of the two across particular secondary windings of the sensing transformers to equalize the output of the reference transformer and the outputs of the sensing transformer. The sensing transformer arrangement may be easily changed merely by moving selected core structures (e.g., bridging members and/or posts) to different positions in the matrix. Preferably, there is included, as a control, an acuating transformer which is positioned at the inner end of the card sensing area and which produces a signal when a card is in proper position to sample all of the sensing transformers and record their outputs. Apparatus constructed in accordance with the invention may be used for a variety of different applications in many types of environments. Such applications include the control of vending operations, the control of access to restricted areas, the identification of card holders, etc.

Other objects, features and advantages of the invention will be seen as the following description of a preferred embodiment thereof progresses, in conjunction with the drawing, in which.

Figure 1:
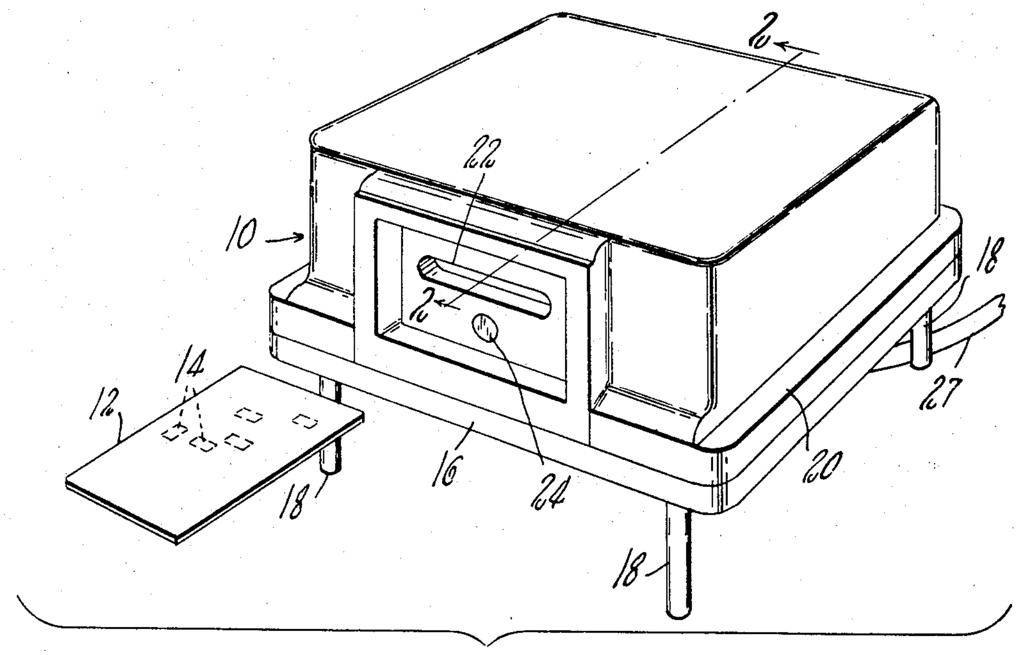
FIG. 1 is a perspective view of a card reader apparatus constructed in accordance with the invention and a typical card configuration that may be employed therewith.

With reference to FIG. 1 there is shown a card reader structure 10 for use with a card 12. This card has a plurality of magnetic indicia 14 disposed in it. These indicia may be segments of magnetic, but nonmagetized, sheet material in the order of ten mils in thickness, a large sheet of similar type with holes in it, magnetic ink, or similar devices. In many applications it is preferred that the indicia be encased within opaque material 15 so that their relative positions are not visually apparent to the card user.

Figure 2:
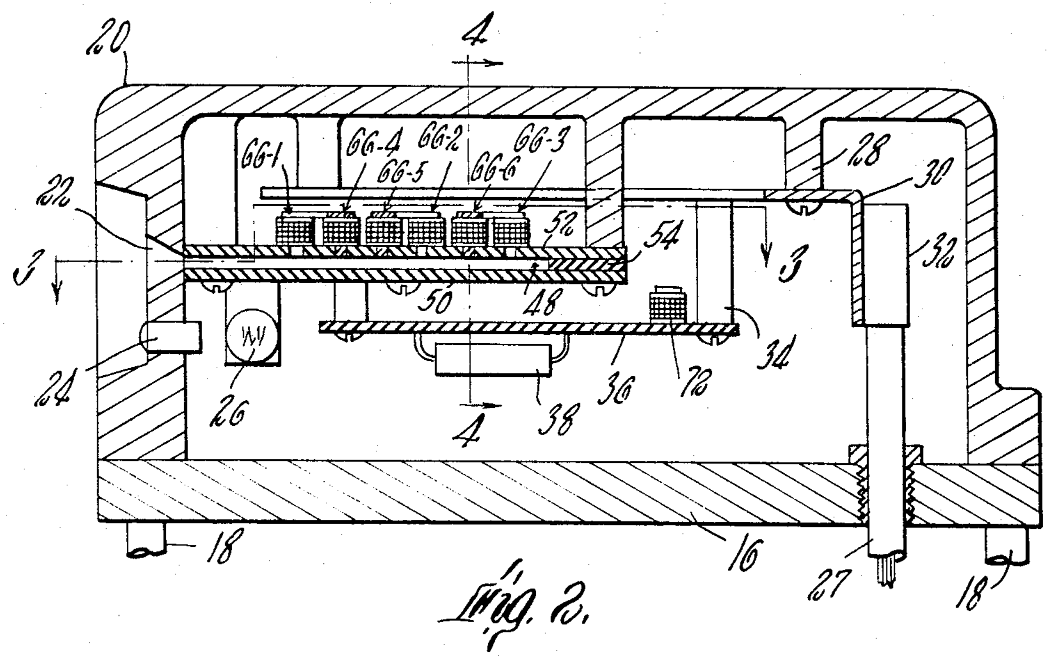
FIG. 2 is a sectional view of the card reader apparatus taken along the line 2—2 of FIG. 1.

The card reader 10 includes an explosion-proof housing having a base 16 which is supported on legs 18 and a cover portion 20. The base and cover are secured together by suitable conventional means such as bolts (not shown). The cover portion 20 has a slot 22 in the front wall thereof through which the card 12 may be inserted for positioning in a card sensing area disposed behind slot 22. Also disposed in the front face of the cover portion 20 is an aperture window 24 behind which a lamp 26 (as shown in FIG. 2) is positioned. Energizing power is applied to the card reader, and control signals are obtained from the card reader over a cable 27 which enters the card reader housing through a suitable explosion-proof fitting of conventional nature in base 16.

With reference to FIG. 2, it will be seen that secured to the cover 20 from depending members 28, is a first support structure 30 on which is mounted a terminal board 32. Connections to and from the cable 27 are made via the terminal board. Also secured to this support and spaced therefrom by spacers 34 is a component support sheet 36 upon which is mounted a series of compensating components which are typically either resistors 38 or capacitors 40.

Figure 5:
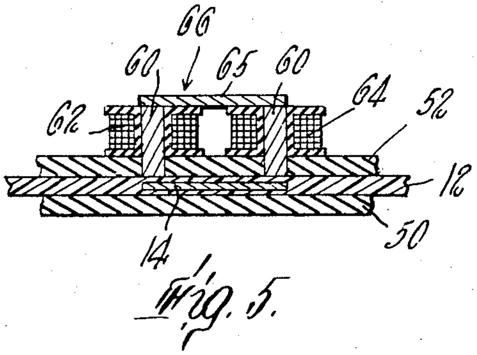
FIG. 5 is a sectional view of a card reader sensing transformer construction taken along the line 5—5 of FIG. 3, the view showing a card in position in the sensing area relative to the illustrated sensing transformer.

Disposed between the two support members is the structure which defines a card sensing area 48 and includes a sheet base member 50, an apertured sheet top member 52, and spacer members 54 which provide the space 48 between the base and top members in which the card 12 is received when inserted through slot 22. As better indicated in FIG. 3, the sheet member 52 has a matrix of apertures 56 which, as shown, are arranged in a 5 x 6 coordinated arrangement. Each aperture 56 is arranged to receive for secure positioning a post structure 60 of magnetic flux conducting material which is disposed so that the lower end of the post is flush with the inside surface of the support sheet 52. Certain of the apertures 56 preferably do not have posts secured in them. The posts are grouped in pairs, and on one post of each pair is disposed a primary winding 62, while on the other post of each pair is disposed a secondary winding 64, as shown in FIG. 5. The primary and secondary windings are preferably, but not necessarily, of the same size and have the same electrical characteristics. A bridging member 65 of magnetic flux conducting material is disposed over the two posts to connect them together in flux conducting relation and preferably is adhesively secured to the tops of the two posts. Thus, there is provided a sensing transformer configuration 66 which includes a U-shaped core. On one leg of the core is disposed a primary winding 62 and on the other leg of the core is disposed a secondary winding 64.

The several sensing transformers have a predetermined orientation as determined by the nature and use of the matrix of apertures 56 in sheet support 52. Thus, in the matrix indicated in FIG. 3 the orientation of the transformers may be either horizontal or vertical, transformers 66–1, 2, 3, 7 and 8 being horizontally oriented and transformers 66–4, 5, 6 and 9 being vertically oriented. It is preferred that a transformer at the rear or inner end of the card sensing area be used as an actuating element which will produce an output signal when a card is fully inserted and in proper position in the card sensing area, and transformer 66–9 serves this function.

Figure 3:
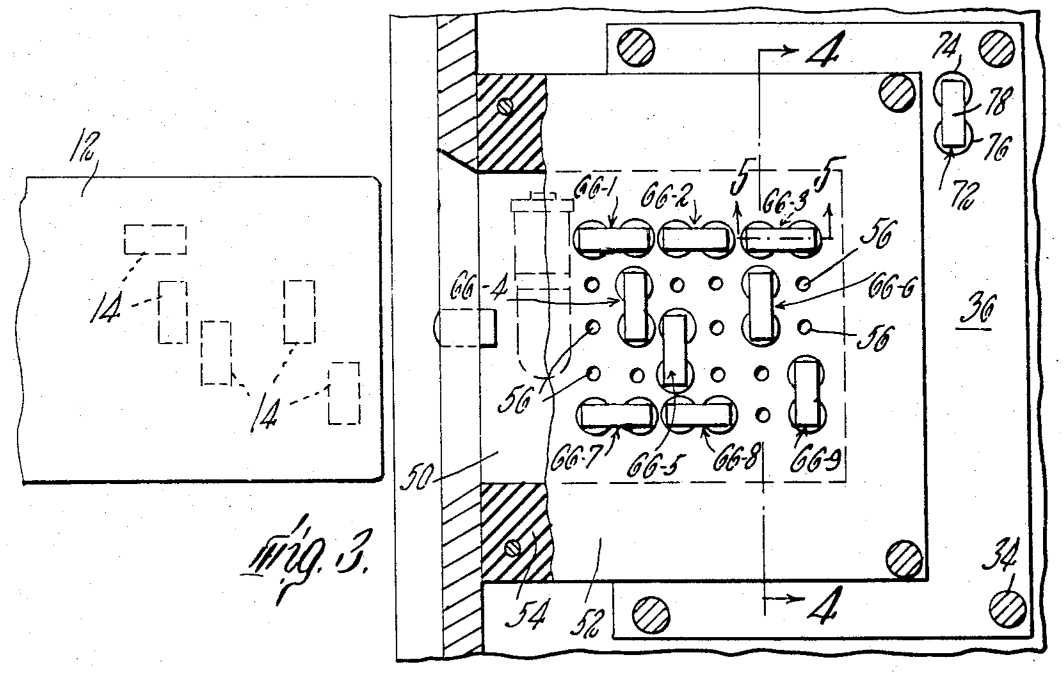
FIG. 3 is a sectional view of the card reader sensing area taken along the line 3—3 of FIG. 2, and a typical configuration of a card to be inserted in the card reader sensing area.
Figure 4:
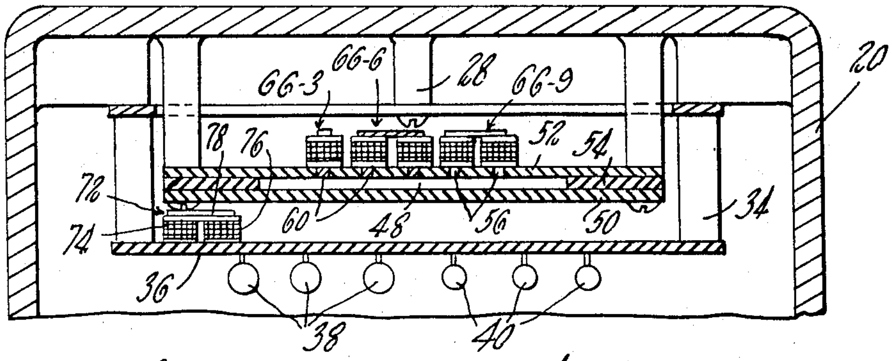
FIG. 4 is a sectional view of the card reader apparatus taken along the line 4—4 of FIG. 2.

The card configuration shown in FIG. 3 has segments 14 arranged in correspondence to the orientation of transformers 66–1, 4, 5, 6 and 9. When the card is inserted fully into sensing area 48, segments 14 are aligned with the ends of the U-shaped cores of those transformers (as indicated in FIG. 5) and reduce the reluctance of their flux paths, resulting in an increase in output signal from the secondaries of those transformers.

There is also provided a reference transformer 72 of substantially identical construction to that of the sensing transformers, having primary winding 74, secondary winding 76, and U-shaped magnetic core circuit 78. This reference transformer is mounted at a point remote from the sensing area on the support sheet 36 that supports the components 38 and 40. Thus, the output of the sensing transformer is not affected by the insertion or removal of the card 12 from the sensing area 48.

Figure 6:
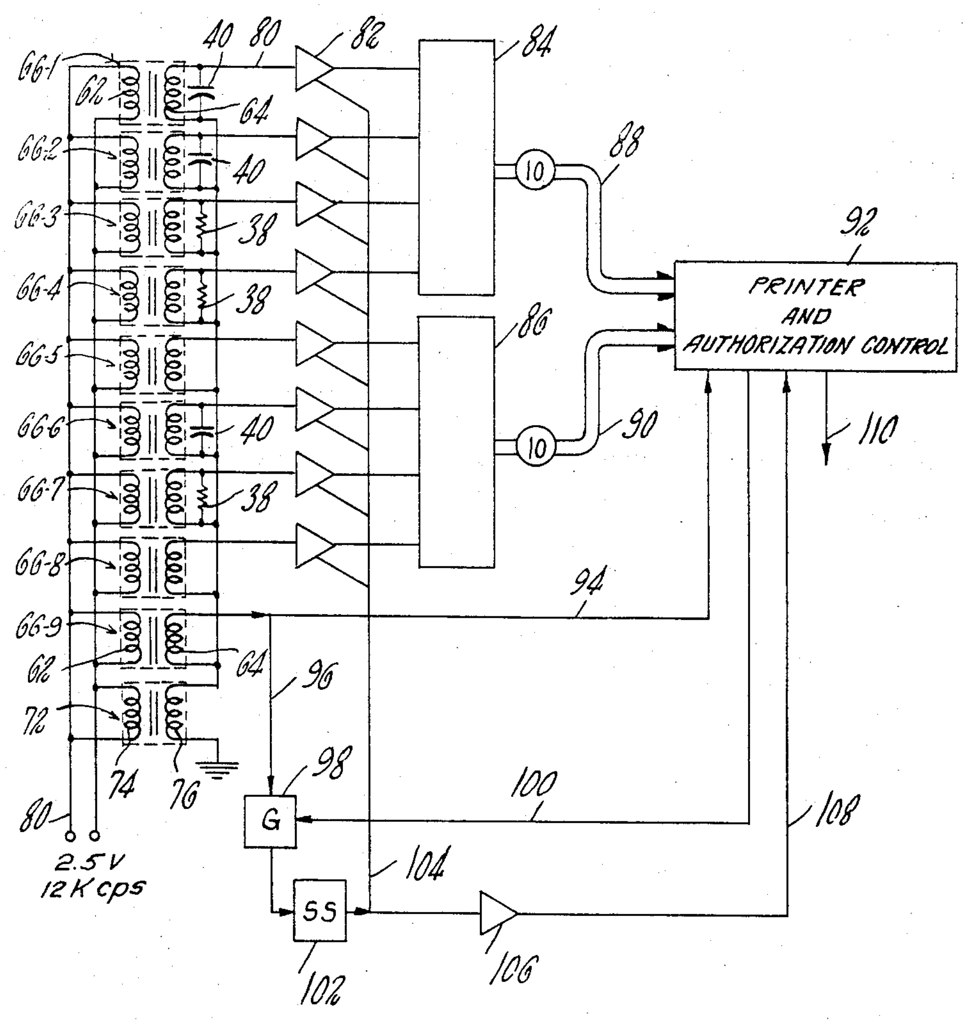
FIG. 6 is a schematic and block diagram of card reader and control apparatus illustrating a typical application of a card reader in accordance with the invention.

The interconnection of the sensing transformers 66 and the reference transformer 72 is indicated in FIG. 6. All the primary windings 62, 74 are electrically identical, all the core magnetic flux paths are identical when a card is not placed in the card reader, and the secondaries 64, 76 are electrically identical. A suitable source, such as a two and one-half volt twelve k.c.p.s. source, is connected via terminals 80 to the primary windings 62 of the sensing transformers 66 and the primary winding 74 of the reference transformer 72. All the primary windings are connected in parallel. One terminal of each sensing transformer secondary is connected to an individual output line 80, while the other terminal of the secondary is connected to the output terminal of the secondary winding 76 of the reference transformer 72 in a series opposition arrangement. The secondaries are referenced to ground through connection of the other terminal of reference secondary 76 to that point. This connection of all the secondaries of the sensing transformers 66 in series opposition to the secondary of the reference transformer 72 results in the output signal from the sensing transformers when they are energized and no card is present being substantially zero. To the extent necessary, phase compensation and amplitude compensation may be obtained by connecting capacitors 40 and/or resistors 38 selectively across the secondaries 64 of the sensing transformers.

In the illustrated embodiment, there are two groups of four sensing transformers which are connected through gating devices 82. One group is connected to a first (units) binary digital converter 84 and the second group is connected to a second (tens) binary digital converter 86. These converters preferably are of the latching type and may include latching relays or solid-state (SCR) components. An output on one of the lines of cable 88 from converter 84 provides a decimal signal of the unit value, while an output on one line in cable 90 provides a corresponding decimal signal of the ten value. With the card arrangement shown in FIG. 3, the units output is NINE and the tens output is THREE or a total of THIRTY NINE. These signals are applied to control an output device 92 indicated as a printer and authorization control unit but which may be other types of apparatus suitable for control by the card reader.

The actuating transformer 66–9 has connected to its secondary output line two lines 94 and 96. Line 94 applies a signal to the controlled apparatus 92, while line 96 applies a signal to a gate 98 which is conditioned by a "ready" signal over line 100 from the apparatus 92 provided when that apparatus has completed a previous operation. An output from gate 102 is applied to a single-shot (one shot) multivibrator to produce an output which on its positive going transition applies a conditioning signal over line 104 to the gates 82 to open those gates and pass signals from the sensing transformer secondaries that have increased signal levels due to the presence of bridging magnetic segments 14 to the converters 84, 86. It will be obvious that threshold level controls may be utilized with the gates to reduce the criticality of conditioning signal level. On the negative going transition inverter 106 applies a signal over line 108 to start the printer and also control a vending or other controlled device by an authorization signal over line 110 at that time.

Operation is thus started by the insertion of a card in the reader. When the output of actuating transformer 66–9 increases, signals representative of the data bits from the sensing transformers, as controlled by the card 12, are stored in converters 84, 86. The controlled device 92 is then signalled and the appropriate action is initiated. The card 12, when removed from the card reader, may terminate a vending operation by termination of the signal over line 94, or a sequence of operations initiated by the card may continue independently of its remaining in position in the card reader.

Output signal sensing is simplified through the use of the reference transformer connection which neutralizes the sensing transformer outputs in the absence of magnetic segments 14 (or similar devices). Further, the system, while simple, has a relatively high degree of security and can be easily changed by authorized personnel to respond to different card configurations.

While a preferred embodiment of the invention has been shown and described, various modifications therein will be apparent to those skilled in the art. Therefore, it is not intended that the invention be limited to the disclosed embodiment or to details thereof, and departures may be made therefrom within the spirit and scope of the invention as defined in the claims.

What is claimed is:

1. A reader for sensing an article having discrete areas thereon of magnetic reluctance different from other areas of the article comprising means defining an article sensing area, a sensing transformer disposed adjacent said sensing area, said sensing transformer including means defining a magnetic flux path having a portion thereof immediately adjacent said article sensing area, a primary winding for inducing flux flow in said flux path, and a secondary winding responsive to flux flow in said flux path, said sensing area defining means including means for receiving the article to be sensed adjacent said flux path defining means to modify the reluctance of the flux path, a reference transformer of substantially the same configuration as said sensing transformer, said reference transformer being disposed at a location remote from said sensing area and including a primary winding and secondary winding, means connecting said reference transformer primary winding and the primary winding of said sensing transformer in parallel, and means connecting said reference transformer secondary winding in series opposition to the secondary winding of said sensing transformer so that said sensing transformer produces substantially zero output when said sensing transformer and said reference transformer are energized and no article is present in said sensing area.

2. The reader as claimed in claim 1 wherein said magnetic flux path defining means comprises two similar post members and a bridging member secured between the tops of said post members to define a U-shaped flux path.

3. The reader as claimed in claim 1 wherein said article sensing area defining means includes a wall portion having a matrix of apertures disposed therein and the sensing transformer flux path defining means are secured in at least some of said apertures.

4. A card reader for sensing a card having discrete areas thereon of magnetic reluctance different from other areas of the card comprising means defining a card sensing area, a plurality of sensing transformers disposed adjacent said card sensing area, each said sensing transformer including a U-shaped magnetic core having the open end portion thereof immediately adjacent said card sensing area, a primary winding for inducing flux flow in said core, and a secondary winding responsive to flux flow in said core, said sensing area defining means including means for receiving the card to be secured adjacent the open ends of said U-shaped cores, a reference transformer of substantially the same configuration as said sensing transformers, said reference transformer being disposed at a location remote from said card sensing area and including a primary winding and a secondary winding, means connecting said reference transformer primary winding and the primary windings of said sensing transformers in parallel, and means connecting said reference transformer secondary winding in series opposition to the secondary winding of each of said sensing transformers so that said sensing transformers produce substantially zero output when said sensing transformers and said reference transformers are energized and no card is present in said sensing area.

5. The reader as claimed in claim 4 wherein said sensing area defining means includes a wall portion having a matrix of apertures disposed therein and the sensing transformer cores are secured in at least some of said apertures.

6. The reader as claimed in claim 5 wherein said magnetic core comprises two similar post members and a bridging member adhesively secured between the tops of said post members.

7. A card responsive control system comprising a card reader including means defining a card sensing area, a plurality of sensing transformers disposed adjacent said card sensing area, each said sensing transformer including a U-shaped magnetic core having the open end portion thereof immediately adjacent said card sensing area, a primary winding for inducing flux flow in said core, and a secondary winding responsive to flux flow in said core, said sensing area defining means including means for receiving the card to be sensed adjacent the open ends of said U-shaped cores, a reference transformer disposed at a location remote from said sensing area and including a primary winding and a secondary winding, means connecting said reference transformer secondary winding in series opposition to the secondary winding of each of said sensing transformers to neutralize the outputs of said sensing transformers in the absence of a card in said sensing area, a controlled apparatus, and means responsive to outputs from selected ones of said sensing transformers in response to the positioning of a card in said sensing area to operate said controlled apparatus.

8. The system as claimed in claim 7 wherein one of said sensing transformers is an actuating transformer, and further including a pulse generating device responsive to said actuating transformer, a plurality of gate devices each responsive to a corresponding one of the other sensing transformers, a data storage device, and means for applying a signal from said pulse generating device to said gate devices to transfer output signals from said other sensing transformers to said storage device.

9. The system as claimed in claim 8 wherein said controlled apparatus includes means to provide a ready signal, and further including means for disabling the response of said pulse generating device to said actuating transformer in the absence of said ready signal.

10. A card reader for sensing a card having discrete areas thereon of magnetic reluctance different from other areas of the card comprising means defining a card sensing area, a plurality of sensing transformers disposed adjacent said card sensing area, each said sensing transformer including a U-shaped magnetic core having the open end portion thereof immediately adjacent said card sensing area, a primary winding for inducing flux flow in said core, and, a secondary winding responsive to flux flow in said core, said sensing area defining means including means for receiving the card to be sensed adjacent the open ends of said U-shaped cores, a reference transformer for producing an output of magnitude equal to that produced by said sensing transformers, said reference transformer being disposed at a location remote from said card sensing area and including a primary winding and a secondary winding, and means connecting said reference transformer secondary winding in series opposition to the secondary winding of each of said sensing transformers so that the output of said reference transformer will neutralize the outputs of said sensing transformers in the absence of a card in said card sensing area.

11. The reader as claimed in claim 10 wherein said sensing area defining means includes a wall portion having a matrix of apertures disposed therein and the sensing transformer cores are secured in at least some of said apertures.

12. The reader as claimed in claim 11 wherein said matrix is of rectangular configuration with the apertures spaced equally in both the horizontal and vertical directions, and each sensing transformer core is positioned in a pair of adjacent apertures.

13. The reader as claimed in claim 12 wherein each said sensing transformer core includes two similar post members secured in adjacent apertures of said matrix and a bridging member secured between the tops of said two post members.

14. The reader as claimed in claim 13 wherein one of said sensing transformers is an actuating transformer, and further including a pulse generating device responsive to said actuating transformer, a plurality of gate devices each responsive to a corresponding one of the other sensing transformers, a data storage device, and means for applying a signal from said pulse generating device to said gate devices to transfer output signals from said other sensing transformers to said storage device.

References Cited

UNITED STATES PATENTS

| | | | |
|---|---|---|---|
| 2,351,008 | 6/1944 | Camras. | |
| 2,926,844 | 3/1960 | Devol | 235—61.11 |
| 3,051,943 | 8/1962 | Simon et al. | 340—347 |

OTHER REFERENCES

Pingry, "Readout from Magnetic Media," IBM Technical Disclosure Bulletin, vol. 4, No. 4, September 1961.

MAYNARD R. WILBUR, *Primary Examiner.*

THOMAS J. SLOYAN, *Assistant Examiner.*

U.S. Cl. X.R.

340—174